(12) United States Patent
Philipp et al.

(10) Patent No.: US 11,654,825 B1
(45) Date of Patent: May 23, 2023

(54) EXTERNALLY ILLUMINATED STEERING WHEEL FOR VEHICLE MODE INDICATION

(71) Applicant: GM GLOBAL TECHNOLOGY OPERATIONS LLC, Detroit, MI (US)

(72) Inventors: Tzvi Philipp, Bet Shemesh (IL); Yael Shmueli Friedland, Tel Aviv (IL); Asaf Degani, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/979,138

(22) Filed: Nov. 2, 2022

(51) Int. Cl.
*B60Q 3/283* (2017.01)
*B62D 1/04* (2006.01)

(52) U.S. Cl.
CPC .............. *B60Q 3/283* (2017.02); *B62D 1/04* (2013.01)

(58) Field of Classification Search
CPC .................................. B60Q 3/286; B62D 1/04
USPC ....................................................... 362/488
See application file for complete search history.

(56) References Cited

U.S. PATENT DOCUMENTS

| 5,203,226 | A  | * | 4/1993 | Hongou | B62D 1/04 74/552 |
| 2020/0262340 | A1 | * | 8/2020 | Prill | B60K 35/00 |
| 2022/0169173 | A1 | * | 6/2022 | Yoo | B60W 50/14 |

* cited by examiner

Primary Examiner — Lau K Tso
(74) Attorney, Agent, or Firm — Quinn IP Law (57) ABSTRACT

A system for indicating an operating mode of a motor vehicle having a vehicle interior and an operator seat arranged therein includes a rotatable steering wheel arranged inside the vehicle interior relative to the operator seat. The steering wheel includes a front side facing the operator seat and an opposing back side. The system additionally includes a light source configured to project a beam of light onto the back side of the steering wheel. The back side of the steering wheel is configured to capture the light beam and illuminate therewith the front side of the steering wheel to thereby generate a sensory signal indicative of the operating mode to a vehicle operator positioned in the operator seat. A motor vehicle employing the system for generating a sensory signal to a vehicle operator for indicating an operating mode of the vehicle is also disclosed.

20 Claims, 5 Drawing Sheets

FIG. 9

EXTERNALLY ILLUMINATED STEERING WHEEL FOR VEHICLE MODE INDICATION

INTRODUCTION

The present disclosure relates to motor vehicle steering wheel with external illumination for indicating vehicle operating mode.

Modern vehicles may employ multiple operating modes including various levels of autonomous operation or driving assistance. Driving assistance systems typically use vehicle sensors, such as lidar, radar, and cameras, along with a GPS signal, to enable autonomous and semi-autonomous vehicle operation. Such sensors are operable to detect vehicle operation and the environment surrounding the vehicle, and in combination with a computing device operable to control various aspects of vehicle operation.

Motor vehicles employing driving assistance typically also employ navigation systems integrated with vehicle controls, drive-by-wire systems, vehicle-to-vehicle communication, and/or vehicle-to-infrastructure technology to identify vehicle position and navigate the vehicle. Additionally, vehicles with driving assistance systems use sensor(s) to evaluate operator's attention to vehicle controls and to the road ahead, as well as indicate whether operator intervention is required. For example, cameras may be used to ensure the operator is watching the road and a display may be provided on the vehicle's steering wheel to indicate the system's current operating mode and/or alert the operator of needed action.

SUMMARY

A system for indicating an operating mode, including various escalations thereof, of a motor vehicle having a vehicle interior and an operator seat arranged therein includes a rotatable steering wheel arranged inside the vehicle interior relative to the operator seat. The steering wheel includes a front side facing the operator seat and an opposing back side. The system additionally includes a light source configured to project a beam of light onto the back side of the steering wheel. The back side of the steering wheel is configured to capture the light beam and illuminate therewith the front side of the steering wheel to thereby generate a sensory signal indicative of the operating mode to a vehicle operator positioned in the operator seat.

The steering wheel may include a wheel rim defining the front side and the opposing back side of the wheel. The wheel rim back side may include a first optical surface facing the light source and configured to capture the light beam. The wheel rim front side may include a second optical surface facing the operator seat and configured to be illuminated by the light beam.

The first optical surface may include a section having a surface feature configured to capture, shape, and focus the light beam.

The surface feature may include a textured area forming a plurality of lenses or prisms.

In a cross-sectional plane, the first optical surface may include a flat portion facing the light source.

The second optical surface may include apertures configured to emit light from the captured light beam.

The system may also include a steering shaft operatively connected to the steering wheel and the light source may be arranged on the steering shaft. In such an embodiment, the captured light beam may illuminate a section of the second optical surface and the illuminated section of the second optical surface may rotate with the steering wheel.

The system may additionally include a steering shaft housing fixed in position relative to the vehicle interior and configured to shield the steering shaft. In such an embodiment, the light source may be arranged on the steering shaft housing. Furthermore, in the subject embodiment, the captured light beam may illuminate a section of the second optical surface and the illuminated section of the second optical surface may remain fixed relative to the operator seat as the steering wheel is rotated.

The light source may include a plurality of light emitting diodes (LEDs) configured to output light in a red-green-blue (RGB) spectrum of color and a 3-channel LED driver configured to control each LED individually to generate the beam of light.

The plurality of LEDs may be arranged on a microchip. In such an embodiment, the light source may additionally include a light beam homogenizing element arranged downstream of the microchip to generate the beam of light.

The light source may include a plurality of collimation lenses arranged upstream of the plurality of LEDs. In such an embodiment, each collimation lens may be configured to align light outputted by a corresponding LED.

The light source may include a fold mirror and a plurality of light beam combiner elements, each arranged downstream of the plurality of collimation lenses. In such an embodiment, the fold mirror may be configured to reflect the light outputted by one of the plurality of the LEDs and the plurality of light beam combiner elements may be configured to merge light beams from remaining LEDs with the light beam reflected by the folding mirror into the beam of light projected onto the back side of the steering wheel.

The sensory signal may be indicative of an operating mode of the motor vehicle, such as a level of the vehicle's autonomous operation. In such an embodiment, the system may additionally include an electronic controller in operative communication with the light source and programmed with an algorithm. The algorithm, when executed by the electronic controller, may be configured to regulate the beam of light in correlation with and indicative of the level of the vehicle's autonomous operation.

A motor vehicle employing the system for generating a sensory signal to a vehicle operator positioned in the operator seat, such as for indicating an operating mode of the vehicle, is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
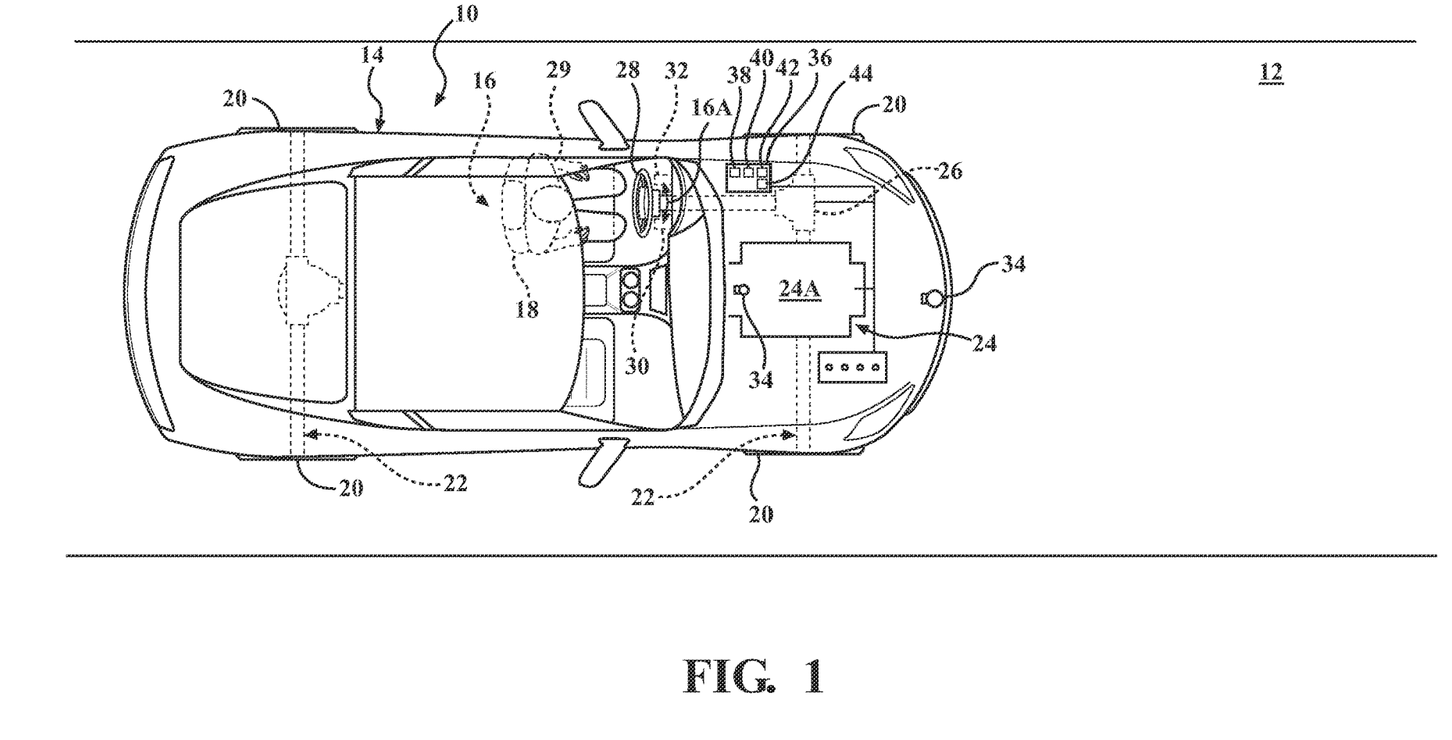
FIG. 1 is a schematic illustration of a motor vehicle including an operator seat arranged inside the vehicle interior and a steering wheel used by a system for indicating an operating mode of the vehicle, according to the disclosure.

Referring to the drawings, wherein like reference numbers refer to like components, FIG. 1 shows a schematic view of a motor vehicle 10 positioned relative to a road surface 12. As shown in FIG. 1, the vehicle 10 includes a vehicle body 14 defining a vehicle interior or passenger compartment 16. An operator seat 18, as well as additional seating surfaces for vehicle passengers, is arranged inside the passenger compartment 16. As shown in FIG. 1, the vehicle 10 includes road wheels 20 and a suspension system 22 operatively connecting the vehicle body 14 to the respective sets of road wheels 20 for maintaining contact between the wheels and the road surface 12.

The motor vehicle 10 additionally includes a drivetrain 24 having one or more power-sources 24A, such as an internal combustion engine (ICE), an electric motor, or a combination of such devices, configured to transmit a drive torque to the first axle with the road wheels 20. The motor vehicle 10 additionally employs a steering actuator 26, e.g., an electrical power steering unit, operatively connected to a rotatable steering wheel 28 arranged inside the passenger compartment 16, mounted in front of the operator seat 18, and configured to steer the front and/or rear road wheels 20 via operator 29 input. The motor vehicle 10 also includes other vehicle controls arranged inside the passenger compartment 16, such as an accelerator device 30 for controlling power output of the power-source(s) 24A and a braking switch or device 32 for retarding rotation of the road wheels 20 (such as via individual friction brakes located at respective road wheels), etc.

As shown in FIG. 1, the motor vehicle 10 may include sensors 34 and an electronic controller 36 which may cooperate to at least partially control, guide, and maneuver the vehicle 10 in an autonomous mode during certain situations. The vehicle 10 having such capability may be referred to as an autonomous vehicle. To enable efficient and reliable autonomous vehicle control, the electronic controller 36 may be in operative communication with the steering actuator 26, accelerator device 30, and braking device 32. The sensors 34 may include a Light Detection and Ranging (LIDAR), radar, and camera located around the vehicle 10 to sense the road surface 12 and monitor a surrounding geographical area and traffic conditions proximate the host vehicle. The sensors 34 may also include devices configured to detect or measure ICE engine and/or electric motor speeds, temperatures, and drive torque, transmission speed ratio, and state of battery charge. Additionally, sensors 34 may include vehicle yaw rate and angle sensors, accelerometer(s), wheel speed sensors, tire pressure sensors, a longitudinal velocity sensor, and a lateral velocity sensor configured to detect corresponding parameters and communicate respective data to the electronic controller 36.

Figure 3:
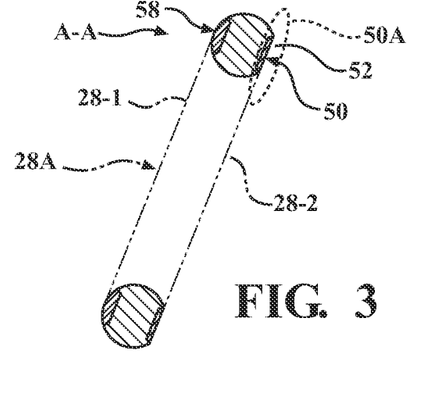
FIG. 3 is a schematic illustration of an embodiment of a rim of the steering wheel in a cross-sectional plane A-A indicated in FIG. 2, according to the present disclosure.

The electronic controller 36 is disposed in communication with the vehicle sensors 34 for receiving their respective sensed data related to the detection or sensing of the road surface 12 and monitoring of the surrounding geographical area and traffic conditions and use a global positioning system (GPS) to pilot the vehicle 10 along a selected path. The electronic controller 36 may alternatively be referred to as a control module, a control unit, a controller, a vehicle 10 controller, a computer, etc. The electronic controller 36 may include a computer and/or processor 38, and include software, hardware, memory, algorithms, connections (such as to sensors 34), etc., for managing and controlling the operation of the vehicle 10. As such, a method, described below and generally represented in FIG. 3, may be embodied as a program or algorithm partially operable on the electronic controller 36.

The electronic controller 36 may be embodied as one or multiple digital computers or host machines each having one or more processors 38, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 36 includes a tangible, non-transitory memory on which computer-executable instructions, including one or more algorithms, are recorded for regulating operation of the motor vehicle 10 systems. The subject algorithm(s) may include an algorithm configured to monitor localization of the motor vehicle 10, determine the vehicle's heading relative to a mapped vehicle trajectory on a particular road surface 12, and regulate operation of the vehicle in an autonomous mode. The electronic controller 36 may also be programmed with an algorithm 40 that, when executed by the electronic controller, is configured to operate a system 42 (to be described in detail below) for generating a sensory signal, such as to indicate an operating mode 44 of the motor vehicle 10. The processor 38 of the electronic controller 36 is configured to execute such algorithms.

Figure 2A:
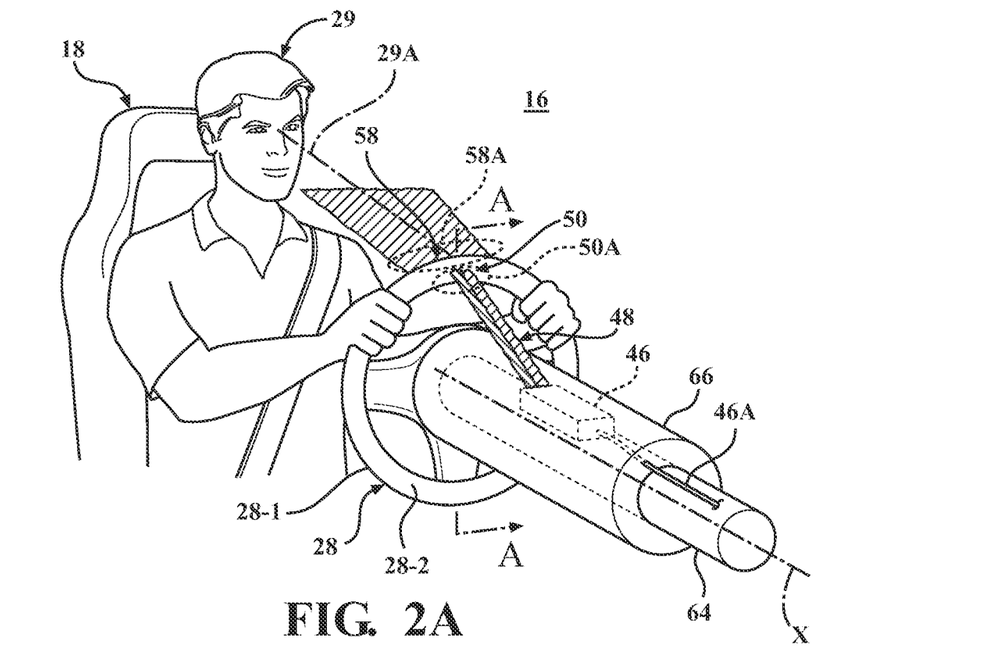
FIG. 2A schematically illustrates a partial view of the interior of the vehicle shown in FIG. 1, depicting a relationship between the operator seated in the operator seat and the steering wheel, and arrangement of a light source directing a light beam at a back side of the steering wheel, according to the present disclosure.
Figure 2B:
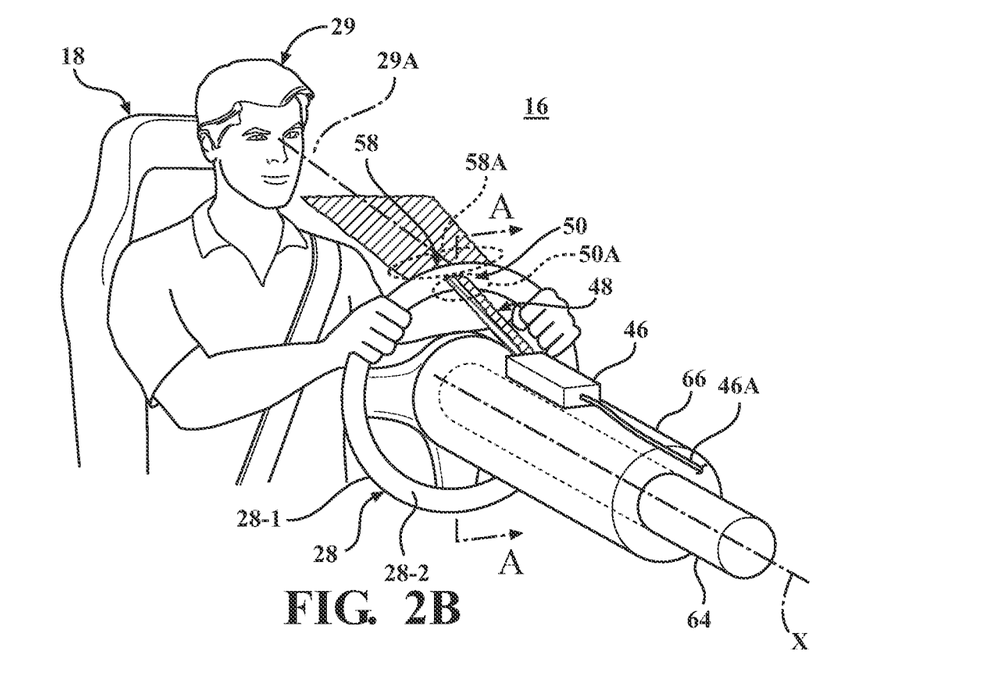
FIG. 2B schematically illustrates a partial view of the interior of the vehicle shown in FIG. 1, depicting the operator seated in the operator seat, the steering wheel, and another arrangement of a light source directing a light beam at a back side of the steering wheel, according to the present disclosure.

As noted above, the motor vehicle 10 employs the steering wheel 28 for the operator 29 to steer the vehicle. The steering wheel 28 is part of the system 42 and, as shown in FIG. 2, includes a front side 28-1 facing the operator seat 18 and an opposing back side 28-2 typically facing an instrument panel 16A of the vehicle 10. Each of the front side 28-1 and the back side 28-2 of the steering wheel 28 may include a wheel rim 28A and a centrally located hub portion 28B near the steering wheel's pivot axis X. With continued reference to FIG. 2, the system 42 also includes a light source 46 configured to generate and project a light beam 48 onto the back side 28-2 of the steering wheel 28. The light source 46 may be operatively connected to a vehicle power source, such as to an electrical battery (not shown) via a wire 46A.

The back side 28-2 of the steering wheel 28 is configured to capture the light beam 48 and illuminate therewith the front side 28-1 of the steering wheel. Such illumination of the steering wheel 28 is intended to generate a sensory signal to the vehicle operator 29 positioned in the operator seat 18. The subject sensory signal is intended to be sufficiently radiant for ease of human perception and may be configured to indicate a current vehicle operating mode 44 and/or a required response from the vehicle operator 29. Accordingly, the front side 28-1 of the steering wheel is specifically configured to be illuminated in a line-of-sight 29A of the seated vehicle operator 29 positioned to operate the vehicle 10. Additionally, intensity of the illumination of the front side 28-1 of the steering wheel may be varied depending on ambient lighting conditions.

For example, the operating mode 44 of the motor vehicle 10 may be a level of the vehicle's autonomous operation, or an escalation mode prompting the user to look at the road ahead or to resume lateral control. Accordingly, to affect such an alert to the vehicle operator 29 with respect to the operating mode 44, the electronic controller 36 may be in operative communication with the light source 46. Specifically, the electronic controller 36 may be programmed with a corresponding algorithm 40 that, when executed by the electronic controller, is configured to regulate operation of the light source 46 and command generation of the light beam 48 in correlation with and indicative of a particular level of the vehicle's autonomous operation. In such an embodiment, the electronic controller 36 may therefore be part of the system 42.

The generation of the light beam 48 and illumination of the front side 28-1 of the steering wheel may be specifically configured to signify that the operator 29 may let go of the steering wheel 28 or is called upon to hold on to or regain control of the vehicle steering wheel. The operating mode 44 of the motor vehicle 10 may also be a mode of operation of the drivetrain 24, an operative condition of auxiliary vehicle system(s), and other alerts configured to draw the operator's attention. The light source 46 may be configured to generate the light beam 48 to form an image, a predetermined pattern, or an animated sequence—for example a sequence of color or frequency of modulation (brightness) with various inter-stimuli time gaps.

Additionally, the shape of a modulated current pulse may be altered—for example, rectangular, triangular, or other shapes may be used for generating a variety of visualization effects. The modulation may be operated either via frequency modulation, current modulation, or a combination of both. Either technique could provide the equivalent effect to the observer of the modulation in intensity and a variation in color per the combination selected. For example, a green color may be modulated at 5 Hz and the red at 7 Hz. In addition, the shape of modulated current pulse may be altered, for example rectangular, triangular, or other shapes may be used to generate a variety of visualization effects.

Figure 4:
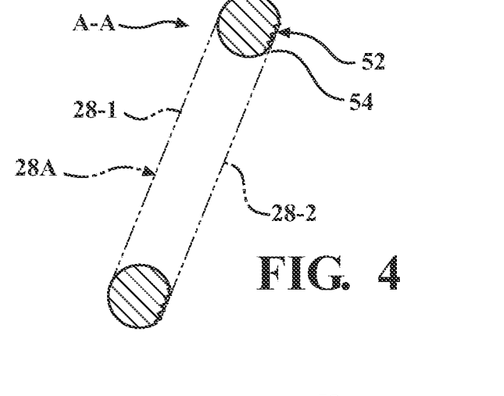
FIG. 4 is a schematic illustration of another embodiment of a rim of the steering wheel rim in a cross-sectional plane A-A indicated in FIG. 2, according to the present disclosure.
Figure 5A:
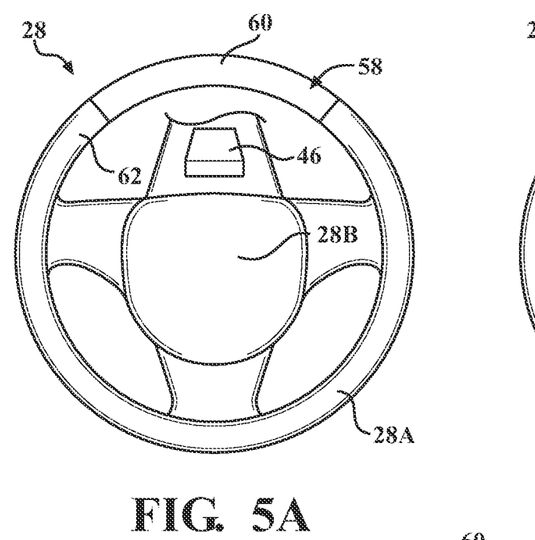
FIG. 5A is a schematic frontal view of an embodiment of the steering wheel shown in FIG. 2, according to the present disclosure.
Figure 5B:
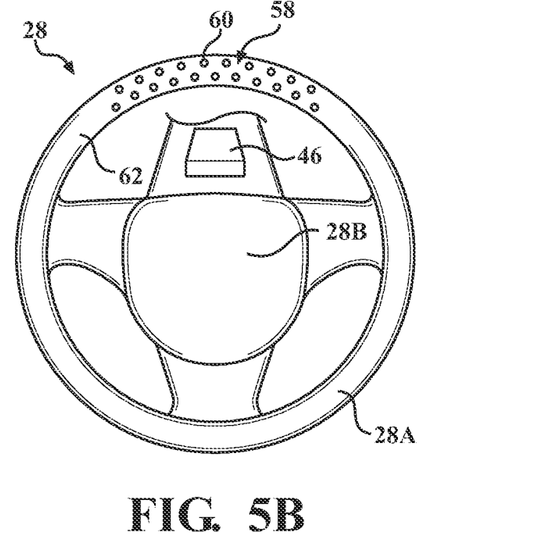
FIG. 5B is a schematic frontal view of another embodiment of the steering wheel shown in FIG. 2, according to the present disclosure.

As may be seen in FIG. 2, the steering wheel may include the wheel rim 28A defining the front side 28-1 and the opposing back side 28-2. The back side 28-2 of the wheel rim 28A may include a first optical surface 50 facing the light source 46 is configured to capture the light beam 48. The first optical surface 50 may include a section 50A (shown in FIG. 2) having a surface feature 52 (shown in FIG. 3) configured to capture, shape, and focus the light beam 48. As may be seen in FIG. 3 in a cross-sectional plane A-A of the wheel rim 28A indicated in FIG. 2, the surface feature 52 may be a flat portion facing the light source 46. As may be seen in FIG. 4 depicting an alternative embodiment of the cross-sectional plane A-A of the wheel rim 28A indicated in FIG. 2, the surface feature 52 may be a three-dimensionally textured area forming a plurality of lenses or prisms 54. The steering wheel 28 may have a continuous wheel rim 28A. The wheel rim 28A may, for example, be shaped as a circular steering helm, as shown in FIGS. 2, 5A, and 5B. The wheel rim 28A may also have a generally circular shape but with a flat or substantially straight bottom (when the wheel is oriented for straight ahead vehicle direction) near the seated operator's legs. Alternatively, the wheel rim 28A may have a generally square shape. In a separate embodiment shown in FIG. 6, the steering wheel 28 may have a discontinuous rim 28A, defining a U-shaped yoke helm. The surface feature 52 may extend around the back side 28-2 of the entire wheel rim 28A or be localized in a particular area thereof.

Figure 6:
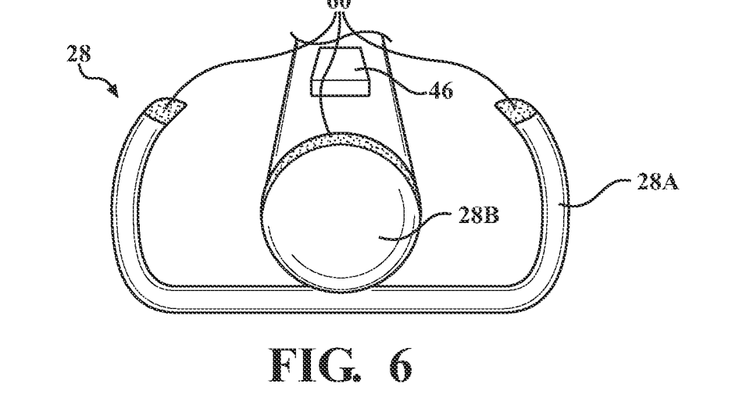
FIG. 6 is a schematic illustration of an embodiment of the steering wheel having a discontinuous rim.

With resumed reference to FIG. 2, the front side 28-1 of the wheel rim 28A may include a second optical surface 58 facing the operator seat 18 and configured to be illuminated by the light beam 48. The second optical surface 58 may include one continuous area 60 (shown in FIG. 5A) of light emission or localized, e.g., strategically located, areas 60 of light emission (shown in FIGS. 5B and 6). For example, as shown in FIG. 5B, the wheel rim 28A may include a wheel rim cover 62, such as sewn from leather, and defining the localized areas 60, which may be perforations or apertures in the cover. In such an embodiment, the wheel rim 28A structure may be illuminated via the light beam 48, while the wheel rim cover 62 mostly blocks emission of the captured light but permits the localized area 60 apertures to emit the captured light therethrough in a particular location within the line-of-sight 29A of the operator 29 positioned in the operator seat 18. As shown in FIG. 6, depicting the steering wheel 28 having the U-shaped yoke helm 28A, at least one of the areas 60 may be arranged on the wheel hub 28B, centrally with respect to the axis X steering. In such an embodiment, the centrally located area 60 will be illuminated and remain in the same general position within the operator's line-of-sight 29A regardless the orientation of the discontinuous rim 28A. Although the wheel hub 28B located area 60 is specifically shown in FIG. 6, such a centrally illuminated area may be employed in other embodiments of the steering wheel 28, such as those shown in FIGS. 5A and 5B.

Typically, as shown in FIG. 2A, the steering wheel 28 is operatively connected or coupled to a rotational steering shaft 64. In the embodiment of the steering wheel 28 illustrated in FIG. 2A, the light source 46 may be arranged on the steering shaft 64. In such a case, the captured light beam 48 may illuminate a section 58A of the second optical surface 58 which is configured to rotate with the steering wheel 28 and with respect to the operator's line-of-sight 29A. The embodiment of the light source 46 arranged on the steering shaft 64 may be particularly useful in the system 42 using the steering wheel 28 with the discontinuous rim 28A, such as the U-shaped yoke shown in FIG. 6. As shown in FIG. 2B, the steering shaft 64 may be sheathed or shielded by a steering shaft housing 66 fixed in position relative to the vehicle interior 16. As shown, the light source 46 may be arranged on or mounted to the steering shaft housing 66. In the embodiment of FIG. 2B, the captured light beam may similarly illuminate the section 58A of the second optical surface 58. However, in such an embodiment, the illuminated section 58A would remain fixed relative to the vehicle interior 16 and the operator seat 18, i.e., fixed in the operator's direct line-of-sight 29A, as the steering wheel 28 is rotated during operation of the vehicle 10. The embodiment of the light source 46 mounted to the steering shaft housing 66 (or to another feature stationary with respect to vehicle interior 16) may direct the light beam 48 to the back side 28-2 of the hub portion 28B, proximate the location where the steering wheel 28 is mounted to the steering shaft 64. The FIG. 2B arrangement of the light source 46 may be useful with the steering wheel 28 having either a continuous or a discontinuous rim 28A.

Figure 7:
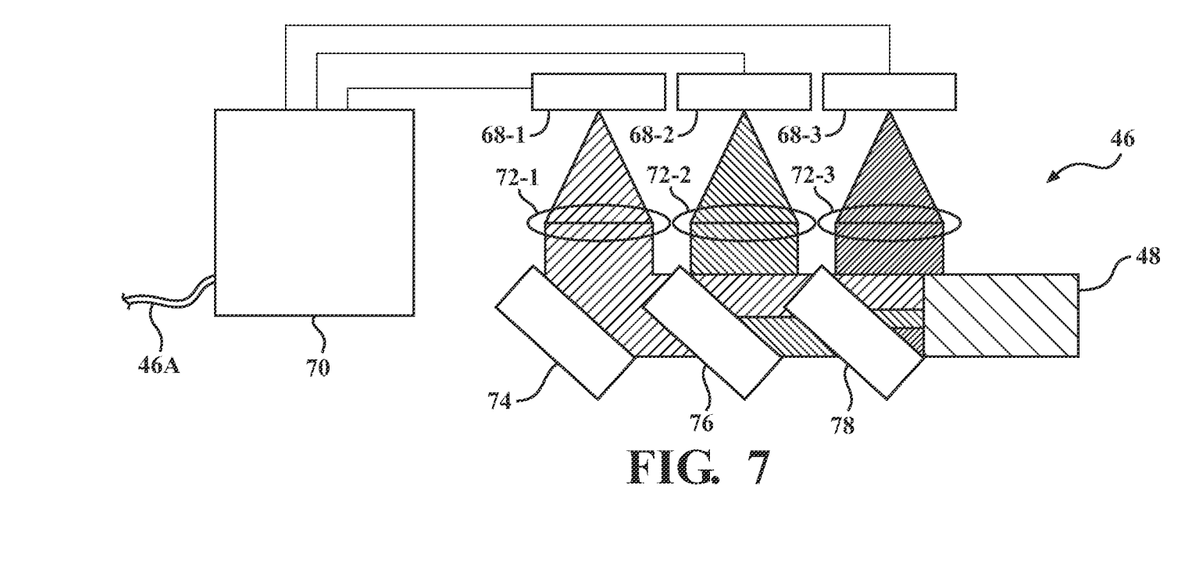
FIG. 7 is a schematic illustration of an embodiment of the light source employing a plurality of light emitting diodes (LEDs) to generate the light beam.
Figure 8:
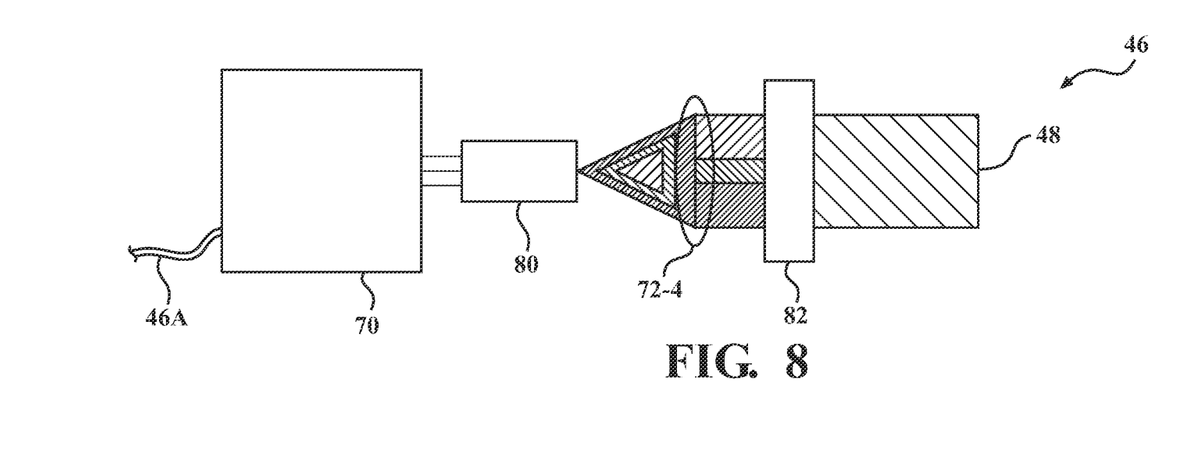
FIG. 8 is a schematic illustration of another embodiment of the light source employing a plurality of light emitting diodes (LEDs) arranged on a microchip to generate the light beam.

As shown in FIGS. 7 and 8, the light source 46 may include a plurality of light emitting diodes (LEDs), depicted as LEDs 68-1, 68-2, and 68-3. The LEDs 68-1, 68-2, 68-3 are configured to output light in a red-green-blue (RGB) spectrum of color—for example, the LED 68-1 may be configured to output red light, LED 68-2 may be configured to output green light, and LED 68-3 may be configured to output blue light. The light source 46 may additionally include a 3-channel LED driver 70 operatively connected to the electronic controller 36. The 3-channel LED driver 70 is configured to control each LED 68-1, 68-2, 68-3 individually to generate a uniformly homogenized beam of white light thereby forming the light beam 48. As specifically shown in FIG. 7, the light source 46 may additionally include a plurality of collimation lenses 72-1, 72-2, 72-3 arranged upstream of the plurality of LEDs 68-1, 68-2, 68-3. Each collimation lens 72-1, 72-2, 72-3 may be configured to align light outputted by a corresponding LED 68-1, 68-2, 68-3.

With continued reference to FIG. 7, the light source 46 may additionally include a fold mirror 74 and a plurality of light beam combiner elements 76, 78. Each of the fold mirror 74 and the plurality of light beam combiner elements 76, 78 is arranged downstream of the plurality of collimation lenses 72-1, 72-2, 72-3. The fold mirror 74 is configured to redirect a light beam outputted by one of the LEDs, such as the 68-1, toward the light beam combiner elements 76, 78. The light beam combiner element 76 is configured to merge or combine the light beams from the LED 68-1 (redirected by the folding mirror 74) and the light beam from the LED 68-2. The light beam combiner element 76 is in turn configured to merge or combine the merged light beams from LEDs 68-1 and 68-2 with the light beam from the LED 68-3 into a homogenized beam of light 48 projected onto the back side 28-2 of the steering wheel.

Figure 9:
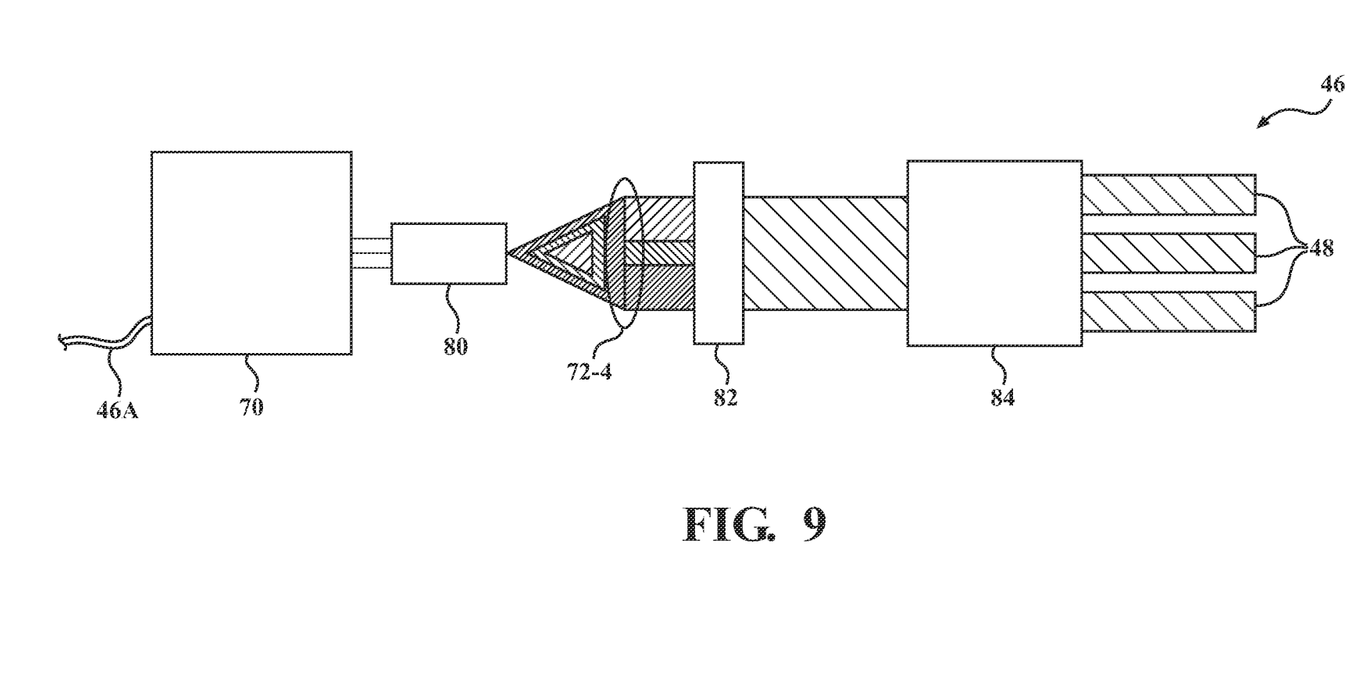
FIG. 9 is a schematic illustration of another embodiment of the light source employing a plurality of light emitting diodes (LEDs) arranged on a microchip and having a beam splitting element to generate a plurality of light beams.

Alternatively, as shown in FIG. 8, the plurality of LEDs 68-1, 68-2, 68-2 may be arranged on a microchip 80. The light source 46 may additionally include a collimation lens 72-4 aft of the LED microchip 80 and a light beam homogenizing element 82 arranged downstream of the collimation lens. The embodiment of FIG. 8 also includes a light beam homogenizing element 82 configured to output a uniformly homogenized beam of white light and thereby generate the light beam 48. In yet another embodiment shown in FIG. 9, downstream of the LED microchip 80 and the light beam homogenizing element 82, the light source 46 may employ a beam splitting element 84 configured to divide output of the beam homogenizing element into a plurality of separate beams 48 directed at individual, spaced apart sections of the wheel rim 28A. The FIG. 9 embodiment of the light source 46 may be particularly useful in the system 42 using the steering wheel 28 with a discontinuous rim 28A, such as the U-shaped yoke helm shown in FIG. 6.

Overall, the system 42 includes the light source 46 arranged remotely from the steering wheel 28 and able to illuminate the wheel either in an area fixed relative to the operator's line-of-sight 29A or in an area that shifts or rotates with the steering wheel. Specifically, the back side of the steering wheel 28 is configured to capture the light beam 48 and illuminate the wheel's front side for generating a sensory signal, for example indicating vehicle's operating mode(s), including various escalations thereof, required vehicle operator response(s), etc. As such, the system 42 permits the light source 46, being decoupled from the steering wheel 28 itself, to facilitate displaying signals in a desired location relative to the operator's line-of-sight and be adapted to various steering wheel shapes.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for indicating an operating mode of a motor vehicle having a vehicle interior and an operator seat arranged therein, the system comprising:

a steering wheel arranged inside the vehicle interior and having a front side facing the operator seat and an opposing back side; and a light source configured to project a beam of light onto the back side of the steering wheel;

wherein the back side of the steering wheel is configured to capture the light beam and illuminate therewith the front side of the steering wheel to thereby generate a sensory signal indicative of the operating mode to a vehicle operator positioned in the operator seat.

2. The system according to claim 1, wherein the steering wheel includes a wheel rim defining the front side and the opposing back side, and wherein the back side of the wheel rim includes a first optical surface facing the light source and configured to capture the light beam and the front side of the wheel rim includes a second optical surface facing the operator seat and configured to be illuminated by the light beam.

3. The system according to claim 2, wherein the first optical surface includes a section having a surface feature configured to capture, shape, and focus the light beam.

4. The system according to claim 2, wherein the second optical surface includes apertures configured to emit light from the captured light beam.

5. The system according to claim 2, further comprising a steering shaft operatively connected to the steering wheel, wherein:
the light source is arranged on the steering shaft;
the captured light beam illuminates a section of the second optical surface; and
the illuminated section of the second optical surface rotates with the steering wheel.

6. The system according to claim 2, further comprising a steering shaft housing fixed in position relative to the vehicle interior and configured to shield the steering shaft, wherein:
the light source is arranged on the steering shaft housing;
the captured light beam illuminates a section of the second optical surface; and
the illuminated section of the second optical surface remains fixed relative to the operator seat as the steering wheel is rotated.

7. The system according to claim 1, wherein the light source includes a plurality of light emitting diodes (LEDs) configured to output light in a red-green-blue (RGB) spectrum of color and a 3-channel LED driver configured to control each LED individually to generate the beam of light.

8. The system according to claim 7, wherein the plurality of LEDs is arranged on a microchip, and wherein the light source additionally includes a light beam homogenizing element arranged downstream of the microchip to generate the beam of light.

9. The system according to claim 7, wherein the light source includes a plurality of collimation lenses arranged upstream of the plurality of LEDs, and wherein each collimation lens is configured to align light outputted by a corresponding LED.

10. The system according to claim 9, wherein:
the light source includes a fold mirror and a plurality of light beam combiner elements, each arranged downstream of the plurality of collimation lenses;
the fold mirror is configured to reflect the light outputted by one of the plurality of the LEDs; and
the plurality of light beam combiner elements is configured to merge light beams from remaining LEDs with the light beam reflected by the fold mirror into the beam of light projected onto the back side of the steering wheel.

11. A motor vehicle comprising:
a vehicle interior;
an operator seat arranged therein;
a rotatable steering wheel arranged inside the vehicle interior and having a front side facing the operator seat and an opposing back side; and
a light source configured to project a beam of light onto the back side of the steering wheel;
wherein the back side of the steering wheel is configured to capture the light beam and illuminate therewith the front side of the steering wheel to thereby generate a sensory signal to a vehicle operator positioned in the operator seat.

12. The motor vehicle according to claim 11, wherein the steering wheel includes a wheel rim defining the front side and the opposing back side, and wherein the back side of the wheel rim includes a first optical surface facing the light source and configured to capture the light beam and the front side of the wheel rim includes a second optical surface facing the operator seat and configured to be illuminated by the light beam.

13. The motor vehicle according to claim 12, wherein the first optical surface includes a section having a surface feature textured to capture, shape, and focus the light beam.

14. The motor vehicle according to claim 12, wherein the second optical surface includes apertures configured to emit light from the captured light beam.

15. The motor vehicle according to claim 12, further comprising a steering shaft operatively connected to the steering wheel, wherein:
the light source is arranged on the steering shaft;
the captured light beam illuminates a section of the second optical surface; and
the illuminated section of the second optical surface rotates with the steering wheel.

16. The motor vehicle according to claim 12, further comprising a steering shaft housing fixed in position relative to the vehicle interior and configured to shield the steering shaft, wherein:
the light source is arranged on the steering shaft housing;
the captured light beam illuminates a section of the second optical surface; and
the illuminated section of the second optical surface remains fixed relative to the operator seat as the steering wheel is rotated.

17. The motor vehicle according to claim 11, wherein the light source includes a plurality of light emitting diodes (LEDs) configured to output light in a red-green-blue (RGB) spectrum of color and a 3-channel LED driver configured to control each LED individually to generate the beam of light.

18. The motor vehicle according to claim 17, wherein the plurality of LEDs is arranged on a microchip, and wherein the light source additionally includes a light beam homogenizing element arranged downstream of the microchip to generate the beam of light.

19. The motor vehicle according to claim 17, wherein:
the light source includes a plurality of collimation lenses arranged upstream of the plurality of LEDs;
each collimation lens is configured to align light outputted by a corresponding LED;
the light source includes a fold mirror and a plurality of light beam combiner elements, each arranged downstream of the plurality of collimation lenses;
the fold mirror is configured to reflect the light outputted by one of the plurality of the LEDs; and
the plurality of light beam combiner elements is configured to merge light beams from remaining LEDs with the light beam reflected by the fold mirror into the beam of light projected onto the back side of the steering wheel.

20. A system for indicating a level of autonomous operation of a motor vehicle having a vehicle interior and an operator seat arranged therein, the system comprising:
a steering wheel arranged inside the vehicle interior and having a front side facing the operator seat and an opposing back side;

a light source configured to project a beam of light onto the back side of the steering wheel, wherein:
  the light source includes a plurality of light emitting diodes (LEDs) configured to output light in a red-green-blue (RGB) spectrum of color and a 3-channel LED driver configured to control each LED individually to generate the beam of light; and
  the back side of the steering wheel is configured to capture the light beam and illuminate therewith the front side of the steering wheel to indicate the level of the vehicle's autonomous operation to a vehicle operator positioned in the operator seat; and
an electronic controller in operative communication with the light source, programmed with an algorithm, and configured to execute the algorithm to regulate the beam of light in correlation with and indicative of the level of the vehicle's autonomous operation.

\* \* \* \* \*